United States Patent [19]

Arin et al.

[11] Patent Number: 5,414,577
[45] Date of Patent: May 9, 1995

[54] MAGNETICALLY COUPLED HARD DISK DRIVE HEAD POSITIONER LATCH

[75] Inventors: Haldun Arin, Moorpark; Kenneth Murray, Granada Hills, both of Calif.

[73] Assignee: Micropolis Corporation, Chatsworth, Calif.

[21] Appl. No.: 52,373

[22] Filed: Apr. 23, 1993

[51] Int. Cl.⁶ .......................... G11B 5/54; G11B 5/55
[52] U.S. Cl. .................................... 360/105; 360/106
[58] Field of Search .......... 360/105, 106, 104, 98.01, 360/97.01, 97.02, 86

[56] References Cited

U.S. PATENT DOCUMENTS

| | | |
|---|---|---|
| 4,647,997 | 3/1987 | Westwood . |
| 4,692,829 | 9/1987 | Campbell . |
| 4,710,834 | 12/1987 | Brand et al. ........................ 360/105 |
| 4,716,480 | 12/1987 | Wiens et al. . |
| 4,725,907 | 2/1988 | Jue . |
| 4,751,595 | 6/1988 | Kishi et al. . |
| 4,807,072 | 2/1989 | Ono et al. ............................. 360/105 |
| 4,864,444 | 9/1989 | Liu et al. . |
| 4,881,139 | 11/1989 | Hazebrouck ..................... 360/97.01 |
| 4,890,176 | 12/1989 | Casey et al. . |
| 4,903,157 | 2/1990 | Malek . |
| 4,949,206 | 8/1990 | Phillips et al. ..................... 360/106 |
| 4,985,793 | 1/1991 | Anderson ............................ 360/105 |
| 4,989,108 | 1/1991 | Chang ................................. 360/105 |
| 5,012,371 | 4/1991 | Pollard et al. . |
| 5,019,932 | 5/1991 | Iwata . |
| 5,023,736 | 6/1991 | Kelsie et al. . |
| 5,144,504 | 9/1992 | Kitazawa . |
| 5,162,959 | 11/1992 | Arin et al. . |
| 5,208,713 | 5/1993 | Lindsay et al. ..................... 360/105 |
| 5,241,438 | 8/1993 | Matsushima ....................... 360/105 |
| 5,262,912 | 11/1993 | Hudson et al. ..................... 360/105 |
| 5,313,354 | 5/1994 | Sampietro et al. ................. 360/105 |
| 5,319,511 | 6/1994 | Lin ...................................... 360/105 |
| 5,329,412 | 7/1994 | Stefansky .......................... 360/105 |

Primary Examiner—Stuart S. Levy
Assistant Examiner—Allen Cao
Attorney, Agent, or Firm—Poms, Smith, Lande & Rose

[57] ABSTRACT

A fail-safe, magnetically coupled head positioner latch assembly for a Winchester-type disk drive comprises a rotatably mounted latch member including an outwardly extending latch arm and tang, and a solenoid assembly. The latch arm is adapted for engaging the head positioner in a parked position, and rotating to a non-interactive position with the latch arm being non-interactive with the head positioner. Magnetic coupling force between a permanent magnet structure and the solenoid assembly causes the latch arm to remain in the non-interactive position during normal disk drive operation. Activation of the latch is accomplished by applying current to the solenoid which generates a magnetic field opposite to that of the permanent magnet structure causing the rotatably mounted latch assembly to rotate so that the latch arm engages the head positioner. The tang is adapted for interacting with a permanent magnet structure as the latch arm engages the head positioner, whereby the magnetic coupling force between the tang and the permanent magnet structure imparts a torquing force to the latch arm which restrains the head positioner in the parked position. Actuation of the head positioner upon initiating normal disk drive activity positively disengages the head positioner from the parked position.

16 Claims, 3 Drawing Sheets

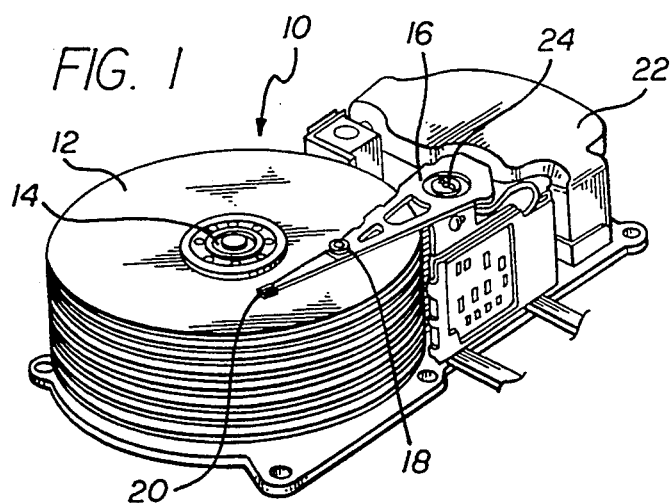
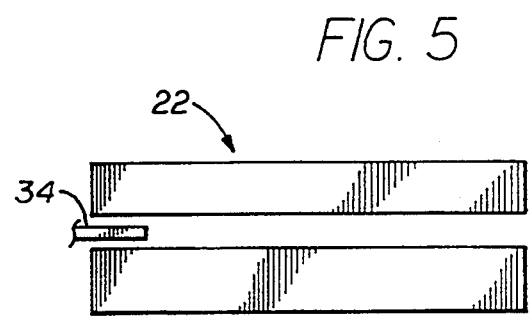
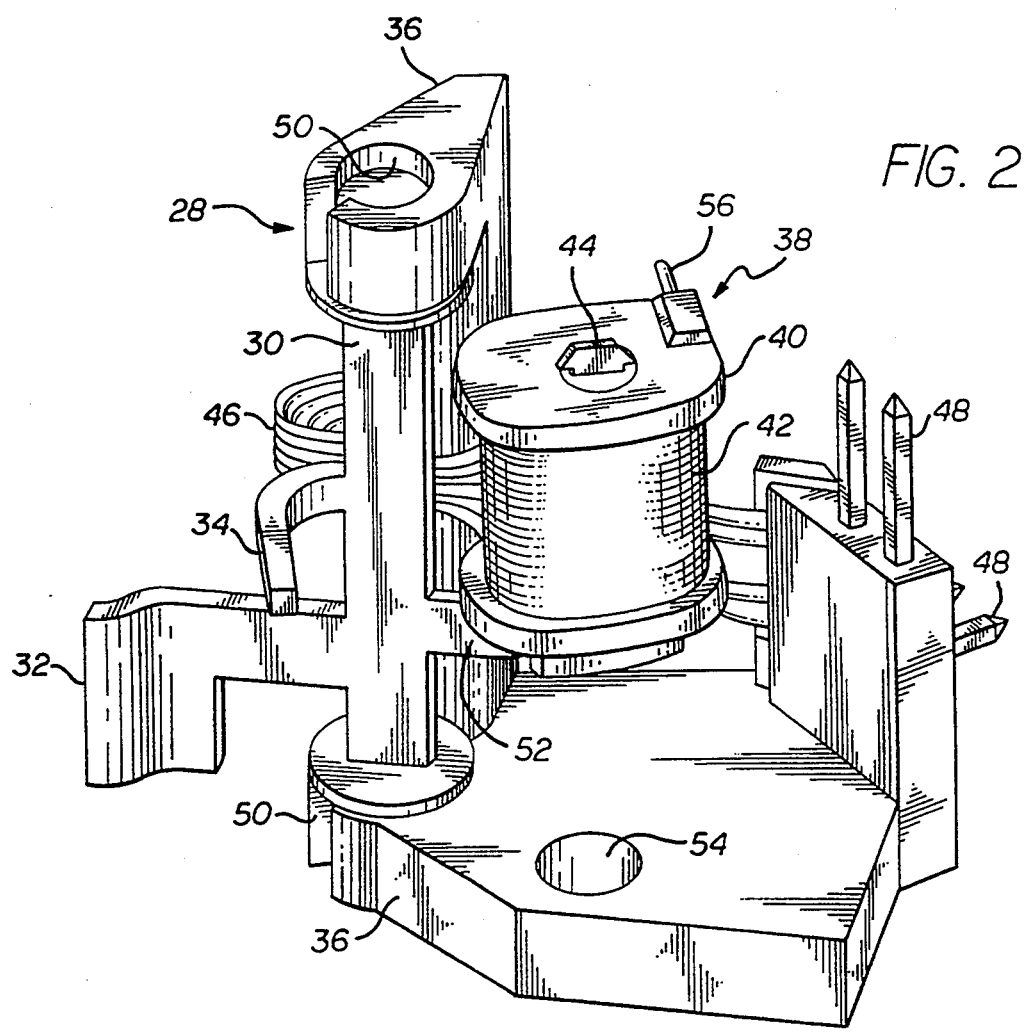

MAGNETICALLY COUPLED HARD DISK DRIVE HEAD POSITIONER LATCH

FIELD OF THE INVENTION

This invention relates to Winchester or hard disk drive digital storage systems. In particular, the present invention relates to a magnetically coupled hard disk drive head positioner latch.

BACKGROUND OF THE INVENTION

In the field of digital data storage systems, most commercial computers employ Winchester-type disk drives to store application program software and related data. Digital data is stored in the form of magnetic energization on a series of concentric, closely spaced tracks partitioned on the surface of magnetizable rigid hard disks. The magnetizable disks typically include an active data storage region and an inactive region often termed the "landing zone." As the magnetic heads sweep across the active data storage region of the disk, digital data is applied to, and retrieved from, specified locations in response to address signals designating the desired storage locations.

When power is removed from the disk drive unit, typically associated with powering down the system, it is desirable to move the head positioner and magnetic heads to a position away from the active data storage region of the disks and over the "landing zone," typically provided on the inner portion or outer periphery of the disk. The process of moving the heads from the active region of the disk to the landing zone is widely known in the art as "parking" the heads. Once the heads are parked, it is desirable to latch the head positioner in the parked position, thus allowing the disk drive unit to be moved from one location to another and to withstand unintentional vibrations and shock without permitting the head positioner to leave the parked position which may otherwise result in damage to the magnetic heads and/or the storage disks.

To latch the head positioner in the parked position, many latching mechanisms employ a solenoid for engaging the head positioner. For example, in U.S. Pat. No. 4,985,793 (hereinafter the "'793 device"), a head positioner parking mechanism utilizes a continuously energized solenoid to hold a head positioner latching body out of engagement with the head positioner during normal disk drive operation. Continuous current applied to the solenoid during disk drive operation is required to generate a magnetic field of sufficient strength to overcome the attractive force between a permanent magnet structure and a magnetically permeable body included on the latching body. When the heads are to be parked, the solenoid is de-energized thereby permitting the latching body to swing into engagement with the head positioner as the magnetic field generated by the solenoid no longer overcomes the magnetic attraction between the latching body and permanent magnet structure. Unlatching of the '793 device requires energization of the solenoid to disengage the latching body from engagement with the head positioner. A disadvantage and limitation of the '793 device is that during operation of the disk drive, an electrical current needs to be continuously applied to the latching solenoid to keep the latching body retracted from the latched position. The required current generates heat in the solenoid which raises the operating ambient temperature of the disk drive unit. This, in turn, requires greater cooling and ventilation capability to offset the added heat load, or reduces the allowed power to the drive for other purposes. Moreover, mechanical and thermal stress, resulting from continuous thermal cycling of the solenoid, may cause early and unpredictable failure of the solenoid. Further, any failure of the solenoid apparatus during the unlatching procedure may cause unwanted latching of the head positioner in the parked position, thereby rendering the disk drive unit inoperable.

Other latching mechanisms, such as that disclosed in U.S. Pat. No. 4,989,108 (hereinafter the "'108 device"), employ an electro-mechanical latch wherein a locking lever is removed from its latching position when a current is applied to the electro-mechanical latch. Unlike the '793 device discussed hereinabove, a current need be applied to the solenoid of the '108 device only for moving the latch to release the head positioner from its parked position. The current may then be removed from the solenoid since the latch is held in a position which is non-interactive with the head positioner during normal disk drive operation. Amongst several of the inherent limitations of the '108 latching device, a significant deficiency involves the necessity of current during the unlatching procedure which must be applied to the latching solenoid in order to release the head positioner from the latched position. A failure of the solenoid apparatus or of the source supplying current to the solenoid will prohibit the head positioner from leaving the locked, parked position.

In other prior art devices, in which a current releases the latch and a mechanical hold feature allows current to be removed from the solenoid, the head positioner may need to have slight over-travel to trigger a hook mechanism which captures the head positioner in its parked position. This over-travel may require that some of the active data storage region be used in conjunction with this over-travel. Should the positioner fail to over travel, the hook mechanism will not engage the latch arm and the positioner will not be locked. Thus, such a scheme inherently wastes valuable disk storage space which reduces the overall storage capacity of the disk drive storage unit. Furthermore, such designs often suffer from excessive mechanical wear and unacceptable surface misalignments that cause the latch to be "sticky" and non-responsive to the unlatching mechanism.

Other head positioner latch mechanisms employ a magnet to accomplish the latching which results in an increase in complexity, an increase in the number of parts, and an increase of allocated chassis space required to house the latching mechanism. Adjustment tolerances between the latching mechanism and the head positioner apparatus often restrict the rotational range of the head positioner which translates into a reduction of effective active data storage surface area.

It is therefore an object of the present invention to overcome one or more of the disadvantages and limitations of the prior art discussed hereinabove. Accordingly, a principal object of the present invention is to provide a fail-safe, magnetically coupled head positioner latch having a simple, low cost design which includes a head positioner being held in the parked position by the magnetic coupling force between the latching mechanism and a permanent magnet structure, and which positively disengages from the latched position by operation of the head positioner upon initiation of normal head positioner activity.

SUMMARY OF THE INVENTION

In accordance with one aspect of the present invention, a magnetically coupled head positioner latch assembly includes a rotatable latch member being movable between a parked position and non-interactive position, and adapted for engaging a head positioner to magnetically restrain the head positioner in the parked position, and for positively disengaging the head positioner from the parked position upon the head positioner initiating normal positioning activity.

One feature of the invention involves a tang extending outwardly from a rotatably mounted latch support and being adapted for interacting with a permanent magnet structure mounted in the chassis of the disk drive unit. Preferably, the tang penetrates a gap provided in the permanent magnet structure when a latch arm, also extending outwardly from the rotatable latch support, engages the head positioner as it moves to the parked position. The magnetic coupling force between the permanent magnet structure and the tang imparts a torquing force to the latch arm which, in turn, exerts a restraining force on the head positioner, thereby restraining the head positioner assembly in the parked position. Unlike conventional mechanical or electromechanical head positioner latches, which employ arrangements to mechanically lock the head positioner in the parked position, the present invention employs magnetic coupling force to hold the head positioner within the parked position. When the latch arm rotatably disengages with the head positioner body upon initiation of normal head positioner activity, the tang swings out of the permanent magnet structure gap and remains unaffected by the confined attractive magnetic field generated by the permanent magnet structure.

An important advantage and novel aspect of the present invention involves the "positive disengage" feature associated with the unlatching of the latch assembly upon initial powering of the disk drive unit. As previously discussed, a latch arm restrains the head positioner in the parked position by magnetic coupling force between the tang and permanent magnet structure while the unit is not being utilized. Upon powering up the hard disk drive unit, releasing, or unlatching, of the magnetically coupled latch is accomplished by energizing the voice coil motor of the head positioner and exerting sufficient force against the latch arm to move it from the parked position to the non-interactive position. In this sense, the head positioner positively disengages from the latch mechanism upon the normal course of powering up the hard disk drive unit, thereby providing a fail-safe method for unlatching the head positioner from the parked position. This arrangement is superior over conventional solenoid-type latching mechanisms which can cause the head positioner to remain in the parked position upon failure of the solenoid, a current source supplying current to the solenoid, or other mechanical arrangements comprising the solenoid-type latching mechanisms.

Another important feature of the present invention involves the manner in which the latch arm remains in a non-interactive position during hard disk drive operation. A solenoid may be included on the rotatable latching assembly which interacts with the permanent magnet structure. The solenoid, preferably mounted on an outwardly extending arm connected to the rotatable latching assembly, includes magnetically permeable material and is susceptible to the leakage magnetic field of the permanent magnet structure when in its proximity. As the solenoid assembly rotates toward the permanent magnet structure, the latch arm swings free of the head positioner to a position where it is non-interactive with the head positioner during disk drive operation. Magnetic coupling force between the solenoid assembly and the permanent magnet structure is sufficient to maintain the latch arm in the non-interactive position while the disk drive is active, and to accommodate shock and vibration associated with the normal operation and usage of the hard disk drive unit. Prior art latching mechanisms, such as the '793 device, require a solenoid to remain continuously energized during normal disk drive operation to maintain the latching mechanism in a non-interactive position with respect to the head positioner. Such mechanisms suffer from one or more of the deficiencies previously described. Other prior art schemes employ a spring mechanism to exert a known biasing force to prevent undesirable interaction of the latching mechanism with the head positioner during disk drive operation. The spring-type designs suffer from inherent reduction of the spring force which changes over time due to spring relaxation and fatigue.

In accordance with another aspect of the present invention, a novel and unique apparatus for latching the head positioner in the parked position involves the solenoid assembly previously discussed above. When the latch arm is in the non-interactive position, the solenoid assembly preferably abuts the permanent magnet structure and is firmly held in place by the magnetic coupling force between the permanent magnet structure and the solenoid assembly. When the latch mechanism is activated, typically associated with powering down the hard disk drive unit, an electrical current is applied to the terminals of the solenoid causing the solenoid to generate a magnetic field opposite to that of the leakage field of the permanent magnet structure. The repulsive force generated by the opposing magnetic fields causes the solenoid assembly to rotate away from the permanent magnet structure, thereby causing the latch arm to engage the head positioner and preferably contacting a latch finger protruding outwardly from the head positioner. During the power-down sequence, the back EMF generated from the spindle motor, onto which the magnetic disks are mounted, is preferably utilized to provide the current to energize the solenoid. In such an arrangement, no external current source is required to activate the magnetically coupled latch during the power-down sequence.

Contemporaneous with the rotation of the solenoid assembly, tang, and latching arm from the non-interactive position to the parked position, the tang penetrates the permanent magnet structure gap which imparts a torquing force to the latch arm which, in turn, firmly restrains the head positioner in the parked position; the torquing force resulting from the magnetic coupling force between the permanent magnet structure and the tang.

In accordance with another aspect of the invention, the length of the tang which penetrates the permanent magnet structure gap may be adjusted to vary the magnet coupling force between the permanent magnet structure and the tang. Varying the intensity of this coupling force results in a stronger or weaker torquing force translated to the latching arm, thereby varying the restraining force exerted by the latching arm on the head positioner while in the parked position.

Another aspect of the invention involves a latch frame structure in which the rotatable latch assembly may be mounted. The latch frame preferably includes at least one electrical connector for connection to a current source. Preferably, a flexible ribbon-type circuit extends between the electrical connector and the solenoid to provide current to the solenoid; the flex circuit having sufficient pliability to accommodate the rotational movement of the solenoid assembly.

Viewed from another aspect, the latching assembly may be considered to be in a bi-stable association with the permanent magnet structure of the drive, having a "parking" state or position when it restrains the head positioner to its parked position, and a second state or position where it is non-interactive with the head positioner. The latch assembly is shifted from its parked position to its non-interactive position when the head positioner is activated, and may be shifted from the non-interactive position to the "parked" position by any desired mechanism, either mechanically or by the energization of a coil on the latch assembly which provides a repulsive magnetic force.

Other objects, features, and advantages of the invention will become apparent from a consideration of the following detailed description and from the accompanying drawings.

BRIEF DESCRIPTION OF THE DRAWINGS

FIG. 1 is a top perspective view of a Winchester or hard disk drive unit with its upper cover removed;

FIG. 2 is a front perspective view of a fail-safe, magnetically coupled hard disk drive head positioner latch;

FIG. 5 is an end view of a portion of a magnet structure.

DETAILED DESCRIPTION OF THE PREFERRED EMBODIMENT

Figure 3:
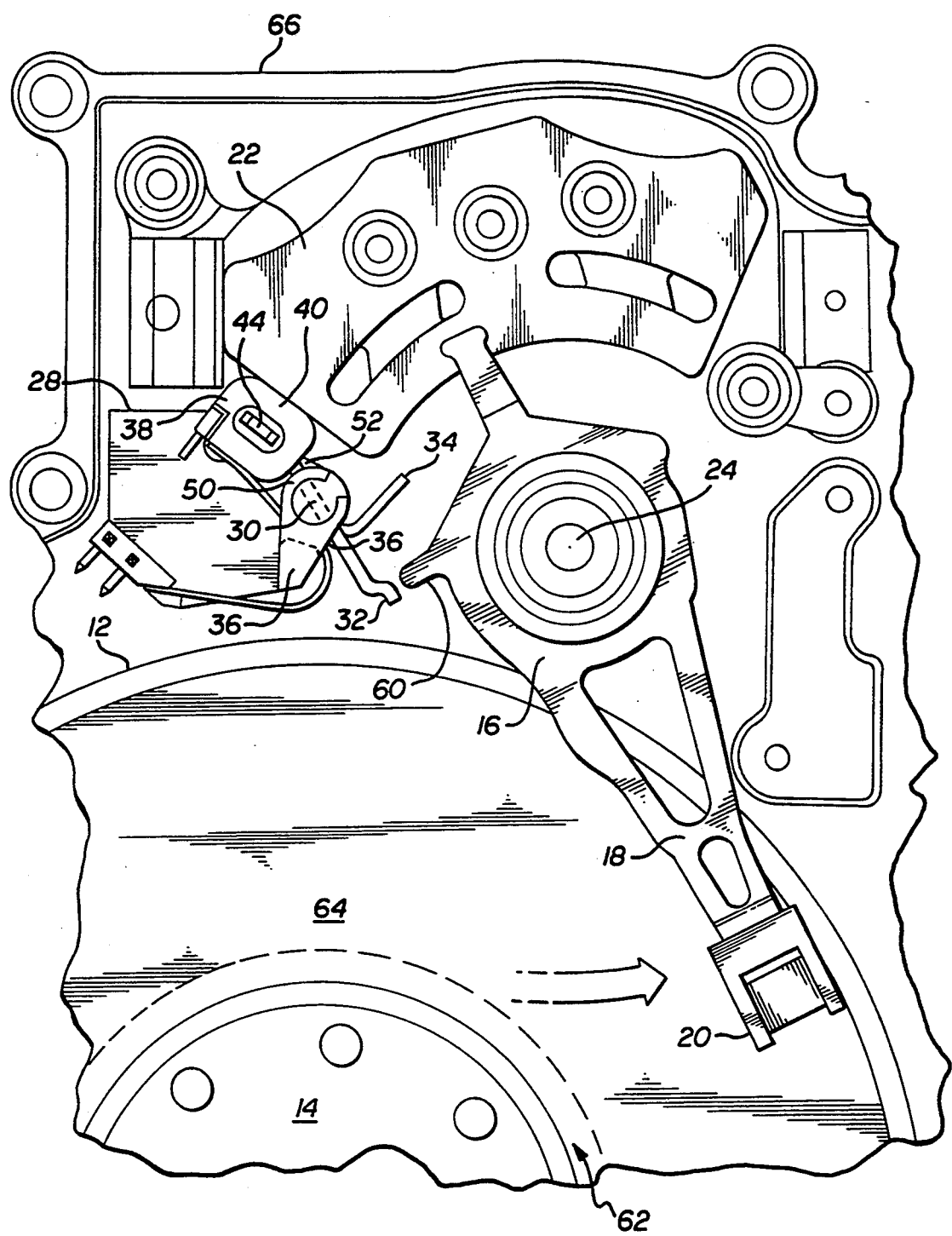
FIG. 3 is a top plan view of a magnetically coupled head positioner latch assembly mounted in a hard disk drive chassis with the latch in the unlatched, or non-interactive, position.

Referring more particularly to the drawings, FIG. 1 illustrates hard disk drive unit 10 with its upper housing cover removed. Hard disk drive unit 10 includes a plurality of rigid magnetic storage disks 12 which are stacked coaxially in a tandem, spaced relationship, and rotate about a common spindle 14 at a relatively high rate of rotation. Head positioner 16 includes a plurality of interleaved head positioner arms 18, each having one or more magnetic heads 20 mounted thereon for reading and writing information magnetically onto magnetic storage disks 12. Head positioner 16 is rotated about a stationary axis 24, causing positioner arms 18 to interleave into and out of magnetic storage disk stack 12. A magnetic coil assembly (not shown), is mounted to head positioner 16 and rotates within permanent magnet structure 22, causing head positioner arms 18 and heads 20 to sweep across the surface of magnetic storage disks 12.

A top perspective view of a magnetically coupled head positioner latch assembly is illustrated in FIG. 2. Integral latch support 30 comprises outwardly extending latch arm 32, angled tang 34, and solenoid arm 52 onto which solenoid assembly 38 is mounted. Latch arm 32, tang 34, and solenoid assembly 38 preferably rotate in unison as latch support 30 rotates within latch support cuffs 50 provided on latch frame 36, these members being preferably fashioned from low carbon steel plated with Nickel-Teflon or other durable material for superior wear. Tang 34 is shown being generally orthogonal to the plane defined by latch arm 32 and solenoid arm 52. It is noted that the orientation of latch arm 32, tang 34, and solenoid assembly 38 integrally included on latch support 30 may differ substantially from that depicted in FIG. 2; the orientation being dependent on the unique configuration of the subject hard disk drive chassis. Flex circuit 46 is connected to coil windings 42 wound about bobbin 40 of solenoid assembly 38, and supplies current to coil windings 42. Flex circuit 46 is shown connected to external power connection 48 which connects with an external current source. Pliable flex circuit 46 is sufficiently flexible to accommodate the rotational movement of solenoid assembly 38 as solenoid assembly 38 and latch support 30 rotate within latch support cuffs 50. Bobbin stop 56 may be included on bobbin 40 to regulate the rotational range of solenoid assembly 38 as solenoid assembly 38 engages latch frame 36. At least one mounting bore 54 may be provided on latch frame 36 for mounting head positioner latch assembly 28 to hard disk drive chassis 66.

FIG. 3 is a top plan view showing head positioner latch assembly 28 mounted in hard disk drive chassis 66 in an unlatched, non-interactive position. Head positioner arm 18, integrally connected to head positioner 16, rotates about stationary axis 24 causing magnetic heads 20 to sweep across the surface of magnetic storage disk 12. Magnetic storage disk 12 includes active storage zone 64 and landing zone 62. It is noted that landing zone 62 may be located along the outer periphery of disk 12 or elsewhere on disk 12.

Head positioner latch assembly 28 is shown in an unlatched configuration with latch arm 32 being non-interactive with head positioner 16. During periods of normal hard disk drive activity, head positioner arm 18, with one or more magnetic heads 20 mounted thereon, is free to sweep across active storage zone 64 of magnetic storage disk 12 whereby data is written to, and read from, concentric, spaced tracks comprising active storage zone 64. When latch arm 32 is in the non-interactive position, solenoid assembly 38 preferably abuts permanent magnet structure 22, being held in place by the attractive magnetic coupling force generated by the magnetic leakage field of permanent magnet structure 22. Bobbin post 44 may comprise magnetically permeable material and extends coaxially through bobbin 40. The magnetic coupling force between permanent magnetic structure 22 and solenoid assembly 38 is sufficiently strong to ensure that latch arm 32 remains in the non-interactive position during normal disk drive operation.

Figure 4:
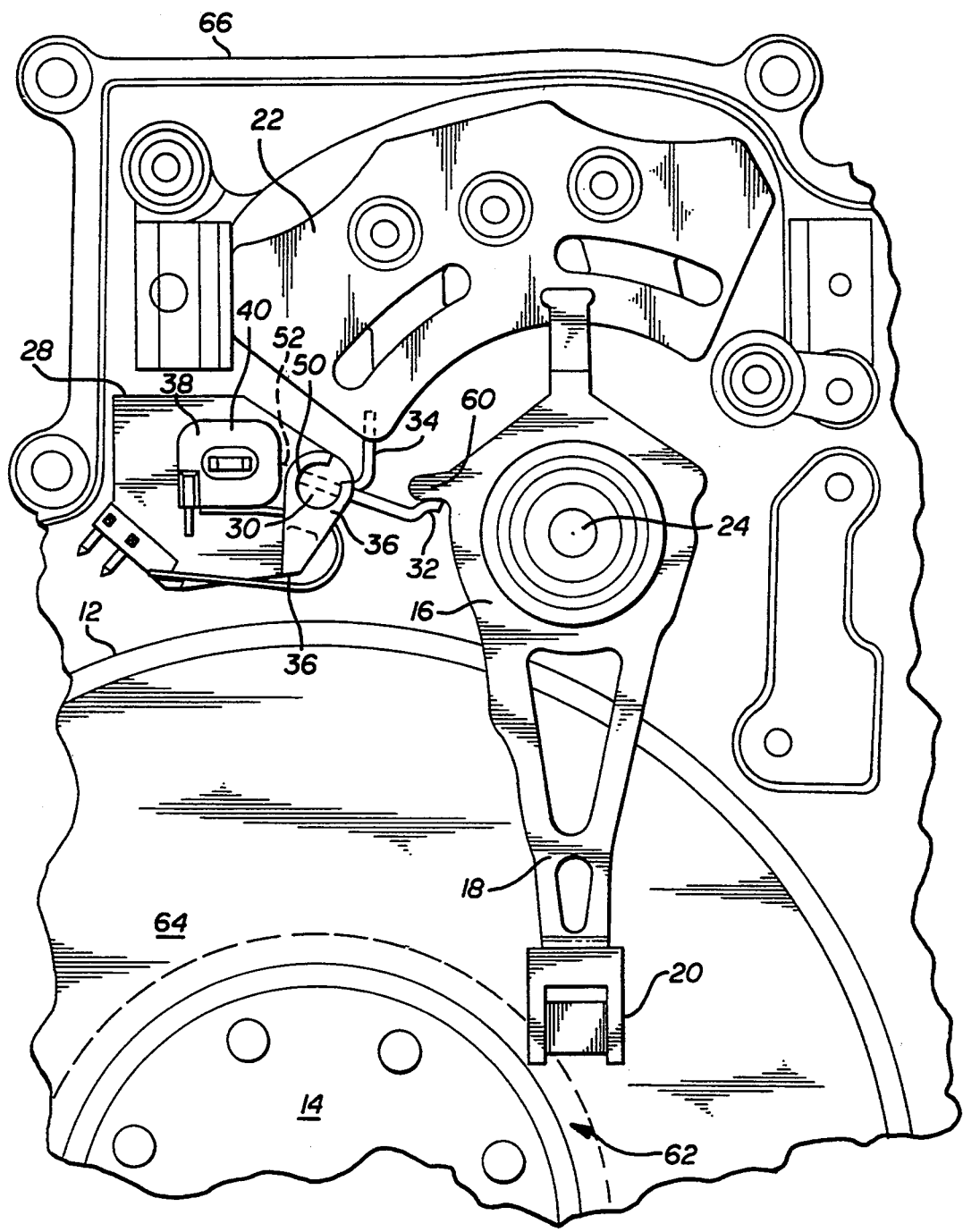
FIG. 4 is a top plan view of a magnetically coupled head positioner latch mounted in a hard disk drive chassis with the latch in the latched, or parked, position.

Head positioner latch assembly 28 is shown in a parked, or latched, orientation in FIG. 4. During the power-down sequence of hard disk drive unit 10, head positioner arms 18 with heads 20 mounted thereon are moved toward the inner portion of magnetic disk 12 coming to rest over landing zone 62. Electrical current is applied to coil windings 42 of solenoid assembly 38 to generate a magnetic field opposite to that of the leakage magnetic field of permanent magnet structure 22. The repulsive magnetic field generated by solenoid assembly 38 is sufficiently strong to cause solenoid assembly 38 to rotate away from permanent magnet structure 22, such that latch arm 32 moves from the non-interactive position toward the parked position and engages latching finger 60 protruding from head positioner 16. Preferably, the back EMF generated by the motor of spindle 14 during powering-down of hard disk drive unit 10 is utilized to supply current to windings 42 of solenoid assembly 38.

As solenoid assembly 38, latch arm 32, and tang 34 rotate in concert with latch support 30 as latch arm 32 moves from the non-interactive position to the parked position, tang 34 penetrates a gap provided within permanent magnet structure 22 (FIG. 5). Permanent magnet structure 22 preferably comprises upper and lower permanent magnet systems having a gap separating the upper and lower magnets. The strength of the magnetic coupling force exerted on tang 34 increases as tang 34 penetrates deeper into permanent magnet structure 22. The magnetic coupling force between permanent magnet structure 22 and tang 34 is sufficiently strong to ensure that the torquing force translated to latch arm 32 and being exerted upon latching finger 60 restrains head positioner arm 18 and head 20 from moving outside of landing zone 62 while hard disk drive unit 10 is not being utilized. The magnetic coupling force between tang 34 and permanent magnet structure 22 may be increased by increasing the length of tang 34 to penetrate deeper into permanent magnet structure 22. Similarly, reducing the effective length of tang 34 reduces the strength of the magnetic coupling force between tang 34 and permanent magnet structure 22. Thus, the latching force of latch arm 34 against latching finger 60 may be calibrated to meet or exceed customary non-operating shock and vibration specifications by adjusting the effective length of tang 34.

A novel feature of the present invention involves the unlatching of head positioner latch assembly 28 from the parked position. Release is accomplished by the initial shifting of head positioner 16 during disk drive system power-up, whereby normal activation of head positioner 16 forces latch arm 32 out of the parked position and into a non-interactive position. As head positioner 16 forces latch arm 32 out of the parked position, tang 34 retracts from the gap in permanent magnet structure 22, and solenoid assembly 38 becomes magnetically attracted to permanent magnet structure 22, thereby ensuring that latch arm 32 remains in the non-interactive position during operation of disk drive unit 10. Unlike prior art latches which require energization or de-energization of a solenoid to unlatch the head positioner, the present invention employs a unique and novel "positive disengage" latching design by which head positioner 16 swings out of the parked position during normal power-up of the disk drive unit and disengages latch arm 32 in a purely mechanical manner. Thus, the present invention provides a fail-safe, magnetically coupled head positioner latch which cannot interrupt normal disk drive activity.

In conclusion, it is to be understood that the foregoing detailed description and the accompanying drawings relate to one illustrative implementation of the present invention. The invention is not limited to this one illustrative implementation. Thus, by way of example and not of limitation, the orientation of tang 34, solenoid assembly 38, and latch arm 32 may be different from that described hereinabove, and need not be integral with latch support 30. Moreover, rotatable latch support 30 may be mounted for rotation in the chassis in a manner that obviates the need for latch frame 36. Further, the latch assembly may involve linear actuation motion rather than rotational motion. The location of the landing zone, which may comprise the inner portion or the outer periphery of the hard disk surface, may further dictate the specific orientation of the latch assembly. The current applied to the solenoid assembly may be supplied from sources other than utilizing the back EMF from the spindle motor during powering down of the disk drive unit. Accordingly, the present invention is not limited to the system as described in detail herein and as shown in the accompanying drawings.

What is claimed is:

1. A hard disk drive storage system including a plurality of magnetic storage disks coaxially mounted on a spindle having a motor, a permanent magnet structure defining a gap in said magnet structure and generating a magnetic field, a rotatable head positioner, including a plurality of magnetic heads, for shifting the position of said heads across said magnetic disks, and a fail-safe magnetically coupled head positioner latch assembly, said positioner latch assembly comprising:

a rotatably mounted latch support;
  a latch arm extending outwardly from said latch support and being moveable between a parked position and a non-interactive position;
  said latch arm adapted for engaging said head positioner to hold said head positioner in the parked position, and said latch arm being non-interactive with said head positioner when said latch arm is in the non-interactive position;
  means for maintaining said latch arm in the non-interactive position during disk drive storage system activity;
  a solenoid assembly included on said latch support for moving said latch arm into the parked position when said solenoid assembly generates a magnetic field opposite to said permanent magnet structure magnetic field in response to an electrical current applied to said solenoid assembly, said electrical current being generated by said spindle motor during hard disk storage system power shut-down; and
  a tang extending outwardly from said latch support and being adapted to penetrate said permanent magnet structure gap;
  wherein said head positioner is restrained by said latch arm in the parked position by a magnetic coupling force between said tang and said permanent magnet structure, and said latch arm is moved out of the parked position by actuation of said head positioner upon initiating hard disk drive system activity.

2. A magnetically coupled head positioner latch assembly as defined in claim 1 further comprising a latch frame in which said latch support is rotatably mounted.

3. A magnetically coupled head positioner latch assembly as defined in claim 1 further including a flexible circuit coupled to said solenoid assembly for transmitting said electrical current to said solenoid assembly.

4. A magnetically coupled head positioner latch assembly as defined in claim 1 wherein said latch arm and said tang are integral with said latch support.

5. A magnetically coupled head positioner latch assembly as defined in claim 1 wherein said latch support, said latch arm, and said tang are fashioned from low carbon steel.

6. A magnetically coupled head positioner latch assembly as defined in claim 1 wherein said tang is adjustable in length to modify the penetration depth of said tang in said permanent magnet structure gap, thereby changing the magnetic coupling force between said tang and said permanent magnet structure.

7. A magnetically coupled head positioner latch assembly as defined in claim 1 wherein each said magnetic storage disk includes an active storage area for storing digital data, said active storage area being unreduced by the operation of said head positioner latch assembly.

8. A magnetically coupled head positioner latch assembly as defined in claim 1 wherein said maintaining means comprises a magnetically permeable body included on said latch arm and adapted to interact with said permanent magnet structure magnetic field, said latch arm being maintained in the non-interactive position when said permeable body is being held by said permanent magnet structure magnetic field.

9. A hard disk drive storage system including a plurality of magnetic storage disks coaxially mounted on a spindle having a motor, a permanent magnet structure defining a gap in said permanent magnet structure and generating a magnetic field, a rotatable head positioner, including a plurality of magnetic heads for shifting the position of said heads across said magnetic disks, and a fail-safe magnetically coupled head positioner latch assembly, said positioner latch assembly comprising:
   a latching member movable from a non-interactive position to a parked position;
   a solenoid assembly included on said latching member, said solenoid assembly generating a magnetic field opposite to said permanent magnet structure magnetic field in response to an electrical current applied to said solenoid assembly, said electrical current being generated by said spindle motor during hard disk storage system power shut-down, said latching member rotating from a non-interactive position to a parked position responsive to the opposing magnetic fields generated by said solenoid assembly and permanent magnet structure;
   means for magnetically restraining said head positioner with said latching member in the parked position; and
   means for magnetically maintaining said latching member in the non-interactive position;
   wherein said latching member is moved out of the parked position by said head positioner upon initiating hard disk drive system activity.

10. A magnetically coupled head positioner latch assembly as defined in claim 9 wherein said restraining means comprises a tang included on said latching member adapted to interact with said permanent magnet structure, whereby said head positioner is restrained by said latching member in the parked position by the magnetic coupling force between said tang and said permanent magnet structure.

11. A magnetically coupled head positioner latch assembly as defined in claim 10 wherein said tang is adjustable in length to modify the penetration depth of said tang in said permanent magnet structure gap, thereby modifying the magnetic coupling force between said tang and said permanent magnet structure.

12. A magnetically coupled head positioner latch assembly as defined in claim 9 wherein said maintaining means comprises a magnetically permeable body included on said latching member and adapted to interact with said permanent magnet structure magnetic field, said latching member being maintained in the non-interactive position when said permeable body is being held by said permanent magnet structure magnetic field.

13. A magnetically coupled head positioner latch assembly as defined in claim 9 further comprising a latch member frame for rotatably mounting said latching member.

14. A hard disk drive storage system including a plurality of magnetic storage disks coaxially mounted on a spindle having a motor, a permanent magnet structure including a gap and generating a magnetic field, a rotatable head positioner, including a plurality of magnetic heads, for shifting the position of said heads across said magnetic disks, and a fail-safe magnetically coupled head positioner latch assembly, said positioner latch assembly comprising:
   a rotatable latch member being moveable between a parked position and a non-interactive position, and adapted for engaging said head positioner to restrain said head positioner in the parked position;
   a solenoid assembly included on said latch member generating a magnetic field opposite to that of said permanent magnet structure and moving said latch member from the non-interactive position to the parked position in response to an electrical current being applied to said solenoid assembly;
   a tang included on said latch member adapted to restrain said latch member in the parked position when said tang interacts with said permanent magnet structure magnetic field, said tang being adjustable in length to modify the penetration depth of said tang in said permanent magnet structure gap, thereby changing a magnetic coupling force between said tang and said permanent magnet structure; and
   means for maintaining said latch member in the non-interactive position during disk drive storage system operation;
   wherein actuation of said head positioner upon initiating hard disk storage system operation moves said latch arm out of the parked position.

15. A magnetically coupled head positioner latch assembly as defined in claim 14 wherein said maintaining means comprises a magnetically permeable body included on said latching member and adapted to interact with said permanent magnet structure magnetic field, said latching member being maintained in the non-interactive position when said permeable body is being held by said permanent magnet structure magnetic field.

16. A magnetically coupled head positioner latch assembly as defined in claim 14 further comprising a latch member frame for rotatably mounting said latch member.

* * * * *